United States Patent
Kawakami et al.

[11] Patent Number: 5,914,840
[45] Date of Patent: Jun. 22, 1999

[54] MAGNETIC TAPE GUIDE APPARATUS

[75] Inventors: Kikuji Kawakami; Hiroyuki Osaki, both of Miyagi, Japan

[73] Assignee: Sony Corporation, Tokyo, Japan

[21] Appl. No.: 08/029,549

[22] Filed: Mar. 11, 1993

[30] Foreign Application Priority Data

Mar. 13, 1992 [JP] Japan .................................. 4-055668

[51] Int. Cl.⁶ .................................................. G11B 15/60
[52] U.S. Cl. ...................................................... 360/130.23
[58] Field of Search .............................. 360/132, 130.23, 360/130.24, 130.21, 137; 242/188, 197, 198, 199

[56] References Cited

U.S. PATENT DOCUMENTS

| | | | |
|---|---|---|---|
| 4,228,940 | 10/1980 | Umehara | 242/76 |
| 4,238,088 | 12/1980 | Schottle et al. | 242/192 |
| 4,427,166 | 1/1984 | Oishi et al. | 242/199 |
| 4,437,222 | 3/1984 | Umehara | 29/527.4 |
| 4,456,160 | 6/1984 | Schoettle et al. | 226/195 |
| 4,466,582 | 8/1984 | Shiba | 242/197 |
| 4,669,019 | 5/1987 | Kuroda | 360/130.24 |
| 4,736,904 | 4/1988 | Schoettle et al. | 242/199 |
| 4,745,508 | 5/1988 | Tollefson | 360/130.21 |
| 4,754,908 | 7/1988 | Tanaka et al. | 226/190 |

FOREIGN PATENT DOCUMENTS

| | | | |
|---|---|---|---|
| 2840069 | 3/1979 | Germany | 360/130.23 |
| 52552 | 4/1980 | Japan | 360/130.23 |
| 57-8948 | 1/1982 | Japan . | |
| 256254 | 11/1987 | Japan | 360/130.23 |

*Primary Examiner*—Allen T. Cao
*Attorney, Agent, or Firm*—Hill & Simpson

[57] ABSTRACT

A magnetic tape guide apparatus which can guide not only a magnetic tape having an applied magnetic layer thereon but also a magnetic thin metal film magnetic tape with a high transport performance is disclosed. The magnetic tape guide apparatus comprises a magnetic tape guide drum or a guide pin having a cylindrical profile for guiding a magnetic tape along a magnetic guide face provided by an outer circumferential face thereof. The magnetic tape guide face is formed as a roughened face wherein the height $\delta$ of crests is selected within the range of 0.2 $\mu$m to 3.0 $\mu$m and the pitch x of the crests is selected so that it satisfies 0.050 mm $\leq x \leq (329\delta)^{1/4}$ mm.

6 Claims, 16 Drawing Sheets

MAGNETIC TAPE GUIDE APPARATUS

BACKGROUND OF THE INVENTION

1. Field of the Invention

This invention relates to a magnetic tape guide apparatus for guiding a magnetic tape.

2. Description of the Related Art

A magnetic tape guide apparatus is incorporated in various magnetic recording and/or reproducing apparatus in which a magnetic tape is employed as a magnetic record medium. An example of such magnetic recording and/or apparatus is a video tape recorder. An example of a conventional magnetic tape guide apparatus for use with a video tape recorder is shown in FIG. 22. Referring to FIG. 22, the magnetic tape guide apparatus shown includes a magnetic head drum 3 including a pair of upper and lower magnetic tape guide drums 1 and 2 having an equal diameter which are disposed on a common axis. A magnetic tape 4 is guided obliquely along a circumferential face of the magnetic head drum 3 while recording onto or reproduction from the magnetic tape 4 is performed by a rotary magnetic head 5 located between the drums 1 and 2.

The magnetic tape guide apparatus further includes a fixed guide pin 6 disposed intermediately of the path of the magnetic tape 4 for guiding the magnetic tape 4.

One of the guide drums 1 and 2 of the magnetic head drum 3, for example, the drum 1, is formed as a rotary drum while the other drum 2 is formed as a fixed drum.

When the magnetic tape 4 is guided by the guide pin 6 and the guide drums 1 and 2 each formed from a columnar or cylindrical member (such guide elements may each be hereinafter referred to as guide member), one of the significant problems is reduction of the transport performance of the magnetic tape 4 which is caused by sticking of the magnetic tape to any of the guide members, particularly by sticking when the guide member is in a fixed condition and the magnetic tape is guided in a slidably contacting condition with the guide member.

Meanwhile, in the field of magnetic recording, the requirement for higher density recording is increasing year by year. In this instance, there is a tendency that thin metal film magnetic tapes are used wherein a magnetic layer is formed by vapor deposition, sputtering or the like of magnetic metal having a high coercive force such as Co—Ni, Co—Cr or Co—O type metal.

In addition, the form of the signal to be recorded is being changed from an analog signal to a digital signal, and designing a record medium in accordance with the digital signal form together with an increase in the recording density is required.

Normally, a so-called in-plane magnetic recording method wherein a magnetic record medium having a more easily magnetized axis in the plane of the recording medium is employed. However, with the in-plane magnetic recording method, the magnetization directions of magnetization sections on the magnetic record medium are arranged such that, as the recording density increases, adjacent magnetization sections repel each other by an increasing repulsive force. Accordingly, there naturally is a limitation in the increase of the recording density, and it is difficult to achieve recording of a required high density.

Further, in the in-plane magnetic recording method, there is a drawback in that, as the distance of reversals of magnetization in a pattern in which a reversal of magnetization repeats twice decreases, that is, as the recording density increases, peak shifts caused by magnetization repulsion and waveform interference increase, and consequently the error rate increases.

Thus, in recent years, remarkable development has been made to perpendicular magnetic recording methods which employ a magnetic record medium having a magnetization-easy axis in a perpendicular direction to the plane of a film of the magnetic record medium.

With the perpendicular magnetic recording method, there is little demagnetizing action compared to the in-plane magnetic recording method, and it is possible to remarkably increase the recording density.

As a magnetic record medium for digital signals to be recorded or reproduced in accordance with the perpendicular magnetic recording method, a magnetic thin metal film magnetic tape of the Co—Ni, Co—Cr or Co—O type which has a superior magnetic characteristic as a perpendicular magnetic record medium or a magnetic film wherein a protective film of carbon or $ZnO_2$ for assuring a high durability and corrosion resistance is provided on a magnetic thin metal film is used.

However, when such a thin metal film magnetic tape is used, since the magnetic tape has a smooth surface, sticking of the magnetic tape to a guide drum or a guide pin of a magnetic tape guide apparatus, which may be caused by an increase of the frictional resistance, causes significant problems compared to a magnetic tape having an applied magnetic layer type.

In such a magnetic tape guide apparatus, the countermeasure for the problem of sticking of a magnetic tape to a guide drum or a guide pin, particularly to a fixed guide drum or a fixed guide pin which guides a magnetic tape in a slidably contacting condition, is normally provided by appropriate selection of a metal material constituting the guide drum or the guide pin (guide member), roughening of the surface of the guide member and so forth.

In particular, roughening of the surface of a guide member so that fine grooves are formed in the circumferential direction of the guide member is performed normally by working a circumferential face of a tubular metal member to be used as the guide member using a cutting tool, and as regards the surface performance of the guide member, various designs have been attempted only as to the height of crests of the concave and convex configuration provided by the fine grooves, that is, a so-called maximum surface height δ(Rmax), as shown in FIG. 1 in which an enlarged section of the guide member at the circumferential guide face 11 for a magnetic tape is schematically shown.

However, even with such means, sticking of a magnetic tape to a magnetic tape guide apparatus still remains as a problem in a high humidity condition particularly for a magnetic recording and reproducing apparatus which is to achieve reduction particularly of the error rate and particularly an error rate on the order of $10^{-5}$.

SUMMARY OF THE INVENTION

It is an object of the present invention to improve the tape transport performance of a magnetic tape guide apparatus which can guide not only a magnetic tape having an applied magnetic layer thereon but also a magnetic thin metal film magnetic tape.

The inventors of the present invention have made various investigations for a cause of sticking of a magnetic tape to a magnetic tape guide face of a guide drum or a guide pin and discovered that such sticking, which raises the coefficient of friction, arises from molecules of water that are attracted to the contacting faces of the magnetic tape and the guide member. This investigation is based on establishment of a method of measurement of a film thickness of a layer of such attracted molecules of water. Then, based on the discovery, the inventors have invented a magnetic tape guide apparatus of the present invention which is superior in the transport performance of a magnetic tape.

In particular, as shown in FIG. 23 in which a microscopic structure of a magnetic tape 4 and a magnetic tape guide face 11 of a guide drum is shown, an attracted water molecule layer 12 is formed on each of the magnetic tape 4 and the guide face 11 of the surface of the fixed rum for guiding the magnetic tape 4. Thus, an investigation of the relationship between the film thickness of the attracted water and the coefficient $\mu$ of friction was examined, and a resulting measurement as illustrated in FIG. 24 was obtained.

In this instance, the height $\delta$ of crests of the guide face 11, that is, the maximum height Rmax of the surface, was 1 $\mu$m, and the mark $\bigcirc$ in FIG. 24 represents data obtained when the environmental temperature was 25° C. while the marks $\Delta$ and $\square$ represent data obtained when the environmental temperature was 40° C. and 50° C., respectively.

It is to be noted that the coefficient $\mu$ of friction was measured in accordance with the following method, and this applies similarly to any measurement described hereinbelow.

A drum to be measured or a pin D is disposed in such a manner as shown in FIG. 25, and a magnetic tape 4 is guided over the angle $\theta$ around a circumferential face of the drum or the pin D. A weight W is coupled to an end of a tape 4 so that tension $T_1$ is applied to the tape 4 by the weight W while a measurement of tension $T_2$ is performed at the other end of the tape 4 by means of a force detector M. Then, the coefficient $\mu$ of friction was measured using the equation 2 below based on the equation 1 below:

$$T_2/T_1 = e\mu\theta \tag{1}$$

$$\mu = (1/\theta)\ln(T_2/T_1) \tag{2}$$

As can be seen from FIG. 24, it was found out that the coefficient $\mu$ of friction relies only upon the film thickness of an attracted water molecule layer and increases suddenly at a particular film thickness.

In short, it was recognized more definitely that the friction between the magnetic tape 4 and the guide face 11, for example, of the fixed drum relies not only upon shearing at a coupling portion provided by direct contact of the two metals with each other but also upon destruction of the attracted water molecules around the coupling portion, and based on this fact, the present invention provides a structure which effectively prevents, even in a high humidity condition, production of an attracted water layer having a film thickness which brings about such a disadvantage.

In particular, according to the present invention, as shown in the schematic sectional view of FIG. 1, a magnetic tape guide face 11 of a guide member 7 for a magnetic tape, that is, a guide drum or a guide pin, is formed as a roughened face wherein the height $\delta$ of crests, that is, a maximum height Rmax, is set to 0.2 $\mu$m to 3.0 $\mu$m and further, the pitch x of the crests satisfies the following equation 3:

$$0.050 \text{ mm} \leq x \leq (329\delta)^{1/4} \text{ mm} \tag{3}$$

Further, according to the present invention, the radius of the guide member 7 for a magnetic tape, that is, a guide drum or guide pin, is set to 0.7 mm to 12 mm.

With the magnetic tape guide apparatus, since sticking of a magnetic tape to the guide can be prevented effectively even in a high humidity condition, stabilized transportation of the magnetic tape can always be assured, and accordingly, a superior transport performance is exhibited in a high humidity condition even for a thin metal film magnetic tape with a smooth surface. This arises from the fact that production of an attracted water molecule layer 12, which increases friction between a magnetic tape and a guide member described hereinabove with reference to FIGS. 23 and 24, is prevented effectively not only by the surface roughness of the guide member but also by consideration of the pitch x of crests in connection with this.

Accordingly, the present invention exhibits a significant advantage particularly when it is applied to a digital video tape recorder wherein the error rate is suppressed to the order of $10^{-5}$.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
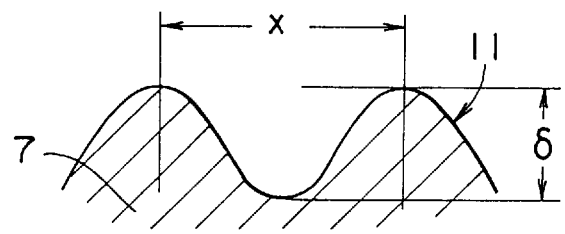
FIG. 1 is a schematic sectional view of a magnetic tape guide face of a guide member.

A magnetic tape guide apparatus according to the present invention is useful when it is applied to a digital tape recorder wherein a color video signal is digitized and recorded onto a magnetic tape and particularly the error rate is reduced lower than the order of $10^{-5}$. First, the magnetic recording and reproducing apparatus, that is, the digital video tape recorder, will be described in accordance with the following order.

A. Construction of Recording and Reproducing Apparatus
   a. Signal Processing Section
   b. Block Coding Section
   c. Channel Encoder and Channel Decoder
   d. Transport system A. Construction of Recording and Reproducing Apparatus As digital video tape recorders, component type digital video tape recorders of the D1 format and composite type digital video tape recorders of the D2 format for broadcasting stations have been put into practical use.

The former D1 format digital video tape recorders convert a brightness signal and first and second color difference signals by analog to digital conversion with the sampling frequencies of 13.5 MHz and 6.75 MHz, respectively, and then perform predetermined processing to record the signals onto a magnetic tape. Since the sampling frequencies of the components make the ratio of 4:2:2, the system is called a 4:2:2 system.

Meanwhile, the latter D2 format digital video tape recorders effect sampling of a composite color video signal with a signal of a frequency which is equal to four times the frequency of a color subcarrier signal to effect analog to digital conversion of the composite color video signal and then performs predetermined signal processing, whereafter it records the thus processed signal onto a magnetic tape.

Anyway, since the digital video tape recorders mentioned above are designed on the assumption that they are both used for broadcasting stations, they give priority to the picture quality and are constructed so that a digital color video signal wherein one sample is converted into, for example, 8 bits by analog to digital conversion is recorded substantially without compressing it.

Accordingly, with a digital video tape recorder, for example, of the D1 format, even if a tape cassette of a large size is used, only a reproduction time of 1.5 hours or so to the utmost can be obtained, and it is not suitable to use the digital video tape recorder of the D1 format as a video tape recorder for a common home.

Thus, in the present embodiment, a signal of the shortest wavelength of 0.5 μm is recorded within the track width of, for example, 5 μm so that the recording density of $4\times10^5$ bit/mm$^2$ or $8\times10^5$ bit/mm$^2$ or more is realized, and by additionally employing a method which compresses recording information in such a form that it involves little reproduction distortion, the present invention is applied to a digital video tape recorder which can record and reproduce for a long time even when a narrow magnetic tape having a tape width $W_T$ of 8 mm or less is used.

a. Signal Processing Section

Figure 2:
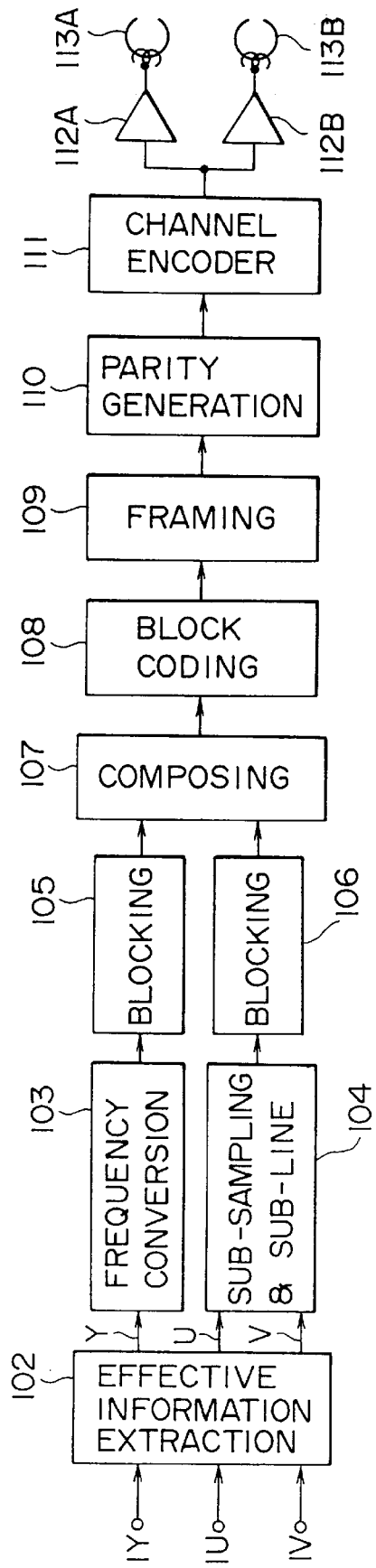
FIG. 2 is a block diagram of a recording side signal processing section of a magnetic recording and reproducing apparatus in which a magnetic tape guide apparatus of the present invention is incorporated.

Referring now to FIG. 2, there is shown general construction of an entire recording system of the digital video tape recorder. The recording system shown has input terminals 1Y, 1U and 1V to which a digital brightness signal Y and digital color difference signals U and V formed from three primary color signals R, G and B, for example, from a color video camera are supplied, respectively. In this instance, the clock rates of the input signals are equal to the frequencies of component signals of the D1 format. In particular, the sampling frequencies of the digital brightness signal Y and the digital color difference signals U and V are 13.5 MHz and 6.75 MHz, respectively, and the number of bits per one sample of the signals is 8 bits. Accordingly, the amount of data of signals supplied to the input terminals 1Y, 1U and 1V is about 216 Mbps (megabits/second). The amount of data is compressed to about 167 Mbps by an effective information extraction circuit 102 which removes data for a blanking time from the input signals but extracts only information in an effective region.

Of the outputs of the effective information extraction circuit 102, the brightness signal Y is supplied to a frequency conversion circuit 103, by which the sampling frequency is reduced from 13.5 MHz to three fourths of the same. For example, a thinning out filter is used as the frequency conversion circuit 103 so as to prevent loopback distortion. An output signal of the frequency conversion circuit 103 is supplied to a blocking circuit 105, by which the order of the brightness data is changed into the order of blocks. The blocking circuit 105 is provided for a block coding circuit 108 provided at a succeeding stage.

Figure 3:
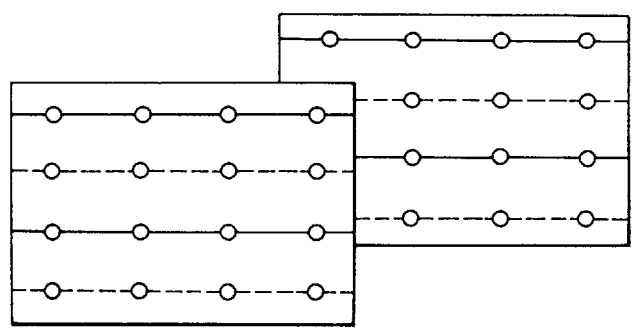
FIG. 3 is a diagrammatic view showing a block of a unit of coding in the signal processing section of FIG. 2.

FIG. 3 illustrates the structure of a block which is a unit of coding. The block shown is a three-dimensional block, and as shown in FIG. 3, a large number of unit blocks of 4 lines×4 picture elements×2 frames are formed, for example, by dividing a screen which spans two frames. It is to be noted that, in FIG. 3, each solid line indicates a line of an odd-numbered field while each broken line indicates a line of an even-numbered field.

Further, of the outputs of the effective information extraction circuit 102, the two color difference signals U and V are supplied to a sub-sampling and sub-line circuit 104, by which the sampling frequencies of them are reduced from 6.75 MHz to one half of the same and then the two digital color difference signals are selected alternately line by line so that they are composed into data of one channel. Consequently, a line sequential digital color difference signal is obtained from the sub-sampling and sub-line circuit 104.

Figure 4:
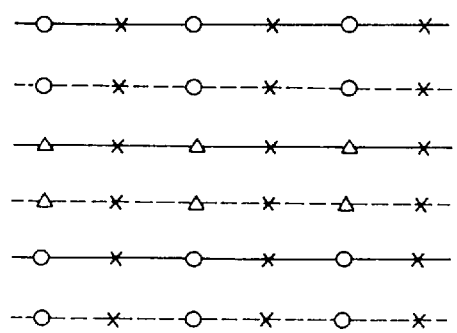
FIG. 4 is a diagrammatic view showing picture elements of a signal processed in the signal processing section of FIG. 2.

The construction of picture elements of the signal obtained by sub-sampling and sub-lining by the sub-sampling and sub-line circuit 104 is illustrated in FIG. 4. Referring to FIG. 4, the mark ○ indicates a sub-sampled picture element of the first color difference signal U; the mark Δ indicates a sub-sampled picture element of the second color difference signal; and the mark x indicates the position of a picture element thinned out by sub-sampling.

Referring back to FIG. 2, the line sequential output signal of the sub-sampling and sub-line circuit 104 is supplied to a blocking circuit 106. In the blocking circuit 106, the color difference data of the order of operation of the television signal is converted into data of the order of blocks, similarly as in the blocking circuit 105. The blocking circuit 106 converts the color difference data into data of the block structure of 4 lines×4 picture elements×2 frames, similarly to the blocking circuit 105. Output signals of the blocking circuits 105 and 106 are supplied to a composing circuit 107.

In the composing circuit 107, the brightness signal and the color difference signal after conversion into the signals of the order of blocks are converted into data of one channel, and an output signal of the composing circuit 107 is supplied to a block coding circuit 108. As the block coding circuit 108, a coding circuit (called ADRC (Adaptive Dynamic Range Coding) circuit) adaptive to a dynamic range for each block, a DCT (Discrete Cosine Transform) circuit and so forth can be applied. An output signal of the block coding circuit 108 is supplied to a framing circuit 109, in which it is converted into data of a frame structure. In the framing circuit 109, crossing-over between clocks of the picture element system and clocks of the recording system is performed.

Subsequently, an output signal of the framing circuit 109 is supplied to a parity generation circuit 110 for an error correction code, in which a parity of an error correction code is generated. An output signal of the parity generating circuit 110 is supplied to a channel encoder 111, in which such channel coding as to decrease a low frequency portion of recording data is performed. An output signal of the channel encoder 111 is supplied to a pair of magnetic heads 113A and 113B by way of a pair of recording amplifiers 112A and 112B and a pair of respective rotary transformers not shown so that it is recorded onto a magnetic tape not shown. It is to be noted that an audio signal is compressed and coded separately from the video signal and supplied to the channel encoder 111.

As a result of the signal processing described above, the amount of input data of 216 Mbps is reduced to about 167 Mbps by extraction only of data in the effective scanning period and is further reduced to 84 Mbps by frequency conversion and sub-sampling/sub-lining. The data is then compressed to about 25 Mbps by compression coding by the block coding circuit 108, and the final amount of data is 31.56 Mbps due to addition of additional information of a parity, an audio signal and so forth after then.

Figure 5:
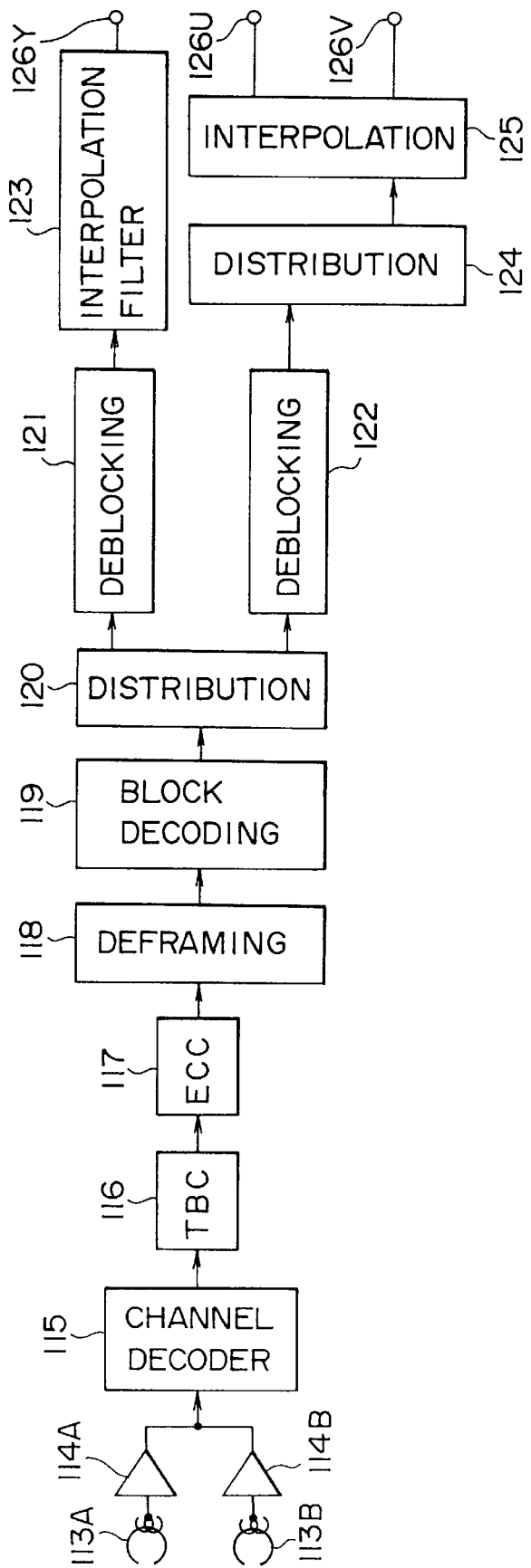
FIG. 5 is a block diagram of a reproduction side signal processing section of the magnetic recording and reproducing apparatus.

Subsequently, general construction of a reproducing system will be described with reference to FIG. 5. Upon reproduction, reproduction data from the magnetic heads 113A and 113B are first supplied to a channel decoder 115 by way of the rotary transformers and a pair of reproduction amplifiers 114A and 114B, respectively. The channel decoder 115 decodes the channel-coded data, and an output signal of the channel decoder 115 is supplied to a TBC circuit (time base correction circuit) 116. In the TBC circuit 116, time base variation components of the reproduction signal are removed. Reproduction data from the TBC circuit 116 is supplied to an ECC circuit 117, in which error correction and error modification are performed using an error correction code. An output signal of the ECC circuit 117 is supplied to a deframing circuit 118.

By the deframing circuit 118, components of the block coded data are separated from one another and crossing-over from clocks of the recording system to clocks of the picture element system is performed. The data separated by the deframing circuit 118 are supplied to a block decoding circuit 119, by which the data are decoded into restoration data corresponding to original data for each block unit. The decoded data is supplied to a distribution circuit 120. The decoded data is separated into a brightness signal and a color difference signal by the distribution circuit 120. The brightness signal and the color difference signal are supplied to a pair of deblocking circuits 121 and 122, respectively. The deblocking circuits 121 and 122 convert the decoded data of the order of blocks into data of the raster scanning order, reversely to the blocking circuits 105 and 106 on the recording side.

The decoded block signal from the deblocking circuit 121 is supplied to an interpolation filter 123. In the interpolation filter 123, the sampling rate of the brightness signal is converted from 3 fs to 4 fs (4 fs=13.5 MHz). The digital brightness signal Y from the interpolation filter 123 is extracted to an output terminal 126Y.

In the meantime, the digital color difference signal from the deblocking circuit 121 is supplied to another distribution circuit 124, in which the line sequential digital color difference signal U and V is separated into digital color difference signals U and V. The color difference signals U and V from the distribution circuit 124 are supplied to another interpolation circuit 125, in which they are interpolated. The interpolation circuit 125 interpolates the lines and the picture elements, which have been thinned out, using the restored picture element data. A pair of digital color difference signals U and V of the sampling rate of 2 fs are obtained from the interpolation circuit 125 and extracted to output terminals 126U and 126V, respectively.

b. Block Coding

An ADRC encoder is employed as the block coding circuit 108 in FIG. 2. The ADRC encoder detects a maximum value MAX and a minimum value MIN of a plurality of picture element data included in each block, detects a dynamic range DR of the block from the maximum value MAX and the minimum value MIN, effects coding of the data in accordance with the dynamic range DR, and requantizes the coded data with a number of bits smaller than the number of bits of the original picture element data. However, the block coding circuit 108 may alternatively be constructed such that picture element data of each block are first processed by DCT processing and then coefficient data obtained by the DCT processing are quantized, whereafter the quantized data are coded by run-length Huffman coding to compress and code them.

Here, an encoder which employs an ADRC encoder and does not cause deterioration of the picture quality even after multi-dubbing will be described with reference to FIG. 6. A digital video signal or a digital color difference signal wherein, for example, one sample is quantized into 8 bits is inputted to an input terminal 27 from the composing circuit 107 of FIG. 2. The blocked data from the input terminal 27 is supplied to a maximum/minimum value detection circuit 29 and a delay circuit 30. The maximum/minimum value detection circuit 29 detects a minimum value MIN and a maximum value MAX for each block. The delay circuit 30 delays the input data by a time required for a maximum value and a minimum value to be detected. Picture element data from the delay circuit 30 are supplied to a pair of comparison circuits 31 and 32.

The maximum value MAX from the maximum/minimum value detection circuit 29 is supplied to a subtraction circuit 33 while the minimum value MIN is supplied to an addition circuit 34. A value ($\Delta=\frac{1}{16}DR$) of one quantization step width in non-edge matching quantization with the fixed length of 4 bits is supplied from a bit shift circuit 35 to the subtraction circuit 33 and the addition circuit 34. The bit shift circuit 35 is constructed so as to shift the dynamic range DR by 4 bits in order to effect a dividing operation of $\frac{1}{16}$. A threshold value of MAX−Δ is obtained from the subtraction circuit 33 while another threshold value of MIN+Δ is obtained from the addition circuit 34. The threshold values from the subtraction circuit 33 and the addition circuit 34 are supplied to a pair of comparison circuits 31 and 32, respectively. It is to be noted that the value Δ which defines the threshold values is not limited to a quantization step width but may be a fixed value corresponding to a noise level.

An output signal of the comparison circuit 31 is supplied to an AND gate 36 while an output signal of the other comparison circuit 32 is supplied to another AND gate 37. The input data from delay circuit 30 are supplied to the AND gates 36 and 37. The output signal of the comparison circuit 31 presents a high level when the input data thereto is higher than the threshold value thereto, and accordingly, picture element data of the input data included in a maximum level range of MAX to MAX–Δ are extracted to the output terminal of the AND gate 36. Meanwhile, the output signal of the other comparison circuit 32 presents a high level when the input data thereto is lower than the threshold value thereto, and accordingly, picture element data of the input data included in a minimum level range of MIN to MIN+Δ are extracted to the output terminal of the AND gate 37.

An output signal of the AND gate 36 is supplied to an averaging circuit 38 while an output signal of the AND gate 37 is supplied to another averaging circuit 39. Each of the averaging circuit 38 and 39 calculates an average value for each block, and a reset signal having the period of one block is supplied from a terminal 40 to the averaging circuits 38 and 39. An average value MAX' of picture element data belonging to the maximum level range of MAX to MAX–Δ is obtained from the averaging circuit 38 while another average value MIN' of picture element data belonging to the minimum level range of MIN to MIN+Δ is obtained from the other averaging circuit 39. The average value MIN' is subtracted from the average value MAX' by a subtraction circuit 41 so that a dynamic range DR' is obtained from the subtraction circuit 41.

Further, the average value MIN' is supplied to another subtraction circuit 42, in which the average value MIN' is subtracted from the input data inputted thereto by way of a delay circuit 43 so that data PDI after removal of minimum values therefrom are formed. The data PDI and the modified dynamic range DR' are supplied to a quantization circuit 44. In the present block coding circuit 108, the ADRC is variable length ADRC wherein the number n of bits allocated to quantization is one of 0 bit (no code signal is to be transmitted), 1 bit, 2 bits, 3 bits and 4 bits, and edge matching quantization is performed. The allocated bit number n is determined for each block by a bit number determination circuit 45, and the data of the bit number n is supplied to the quantization circuit 44.

In the variable length ADRC, the bit number n is made small for a block having a small dynamic range DR', but the bit number n is made large for another block having a large dynamic range DR' so that efficient coding may be performed. In particular, when the threshold values for determination of the bit number n are represented by T1 to T4 (T1<T2<T3<T4), in the case of a block of DR'<T1, a code signal is not transferred while only information of the dynamic range DR' is transferred; in the case of a block of T1≦DR'<T2, the bit number n is set to n=1; in the case of a block of T2<DR'<T3, the bit number n is set to n=2; in the case of a block of T3<DR'<T4, the bit number n is set to n=3; and in the case of a block of DR'≧T4, the bit number n is set to n=4.

In such variable length ADRC, the amount of information to be generated can be controlled (so-called buffering) by varying the threshold values T1 to T4. Accordingly, the variable length ADRC can be applied to such a transmission line as of a digital audio video tape recorder of the present embodiment for which it is required that the amount of information to be generated for one field or one frame be set to a predetermined value.

In a buffering circuit 46 for determining the threshold values T1 to T4 to make the amount of information to be generated a predetermined value, a plurality of, for example, 32, sets of threshold values (T1, T2, T3, T4) are prepared. The sets of the parameters are distinguished from one another with a parameter code Pi (i=1, 1, 2, . . . , 31). As the number i of the parameter code Pi increases, the amount of information to be generated decreases monotonously. However, as the amount of information to be generated decreases, the picture quality of the restored image is deteriorated.

The threshold values T1 to T4 from the buffering circuit 46 are supplied to a comparison circuit 47 while the dynamic range DR' is supplied to the comparison circuit 47 by way of a delay circuit 48. The delay circuit 48 delays the dynamic range DR' by a time required for a set of threshold values to be determined by the buffering circuit 46. In the comparison circuit 47, the dynamic range DR' of the block and the threshold values are successively compared with each other, and a result of the comparison is supplied to the bit number determination circuit 45, in which the allocated bit number n of the block is determined. In the quantization circuit 44, the data PDI after removal of minimum values therefrom, which are received by way of a delay circuit 49, are converted into a code signal DT by edge matching quantization using the dynamic range DR' and the allocated bit number n. The quantization circuit 44 may be constituted, for example, from a ROM.

Figure 6:
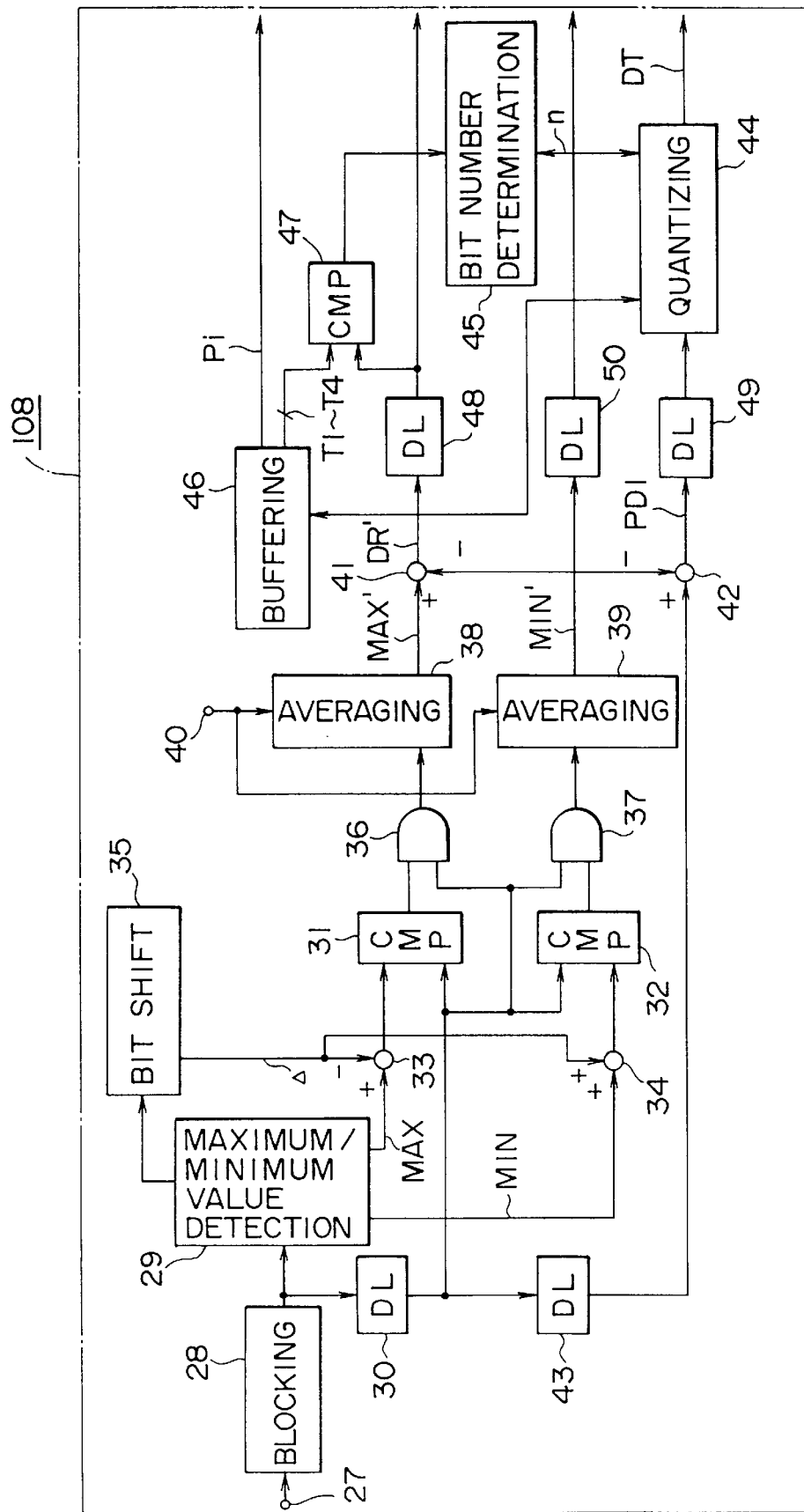
FIG. 6 is a block diagram of a block coding circuit of the signal processing section of FIG. 2.

The modified dynamic ranges DR' and the modified average value MIN' are outputted from the block coding circuit 108 of FIG. 6 by way of a pair of delay circuits 48 and 50, respectively, and further, the code signal DT and the parameter Pi indicative of the set of threshold values are outputted from the block coding circuit 108. In the present block coding circuit 108, since a signal quantized once by non-edge matching quantization is newly quantized by edge matching quantization based on dynamic range information, the image deterioration involved in dubbing is reduced.

c. Channel Encoder and Channel Decoder

Figure 7:
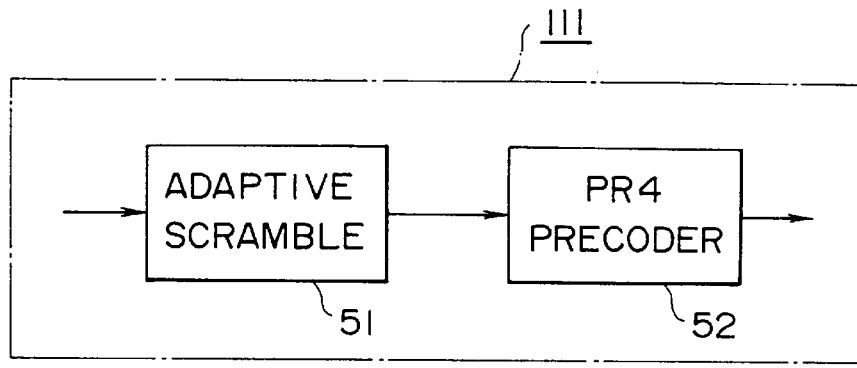
FIG. 7 is a block diagram of a channel encoder of the signal processing section of FIG. 2.

The channel encoder 111 and the channel decoder 115 shown in FIG. 2 will be described in more detail below. Referring to FIG. 7, the channel encoder 111 includes a plurality of M sequence scramble circuits 51 in the form of adaptive scramble circuits to which the output of the parity generation circuit 110 shown in FIG. 2 is supplied and which are constructed so that an M sequence with which an output which presents least high frequency components and dc components for the input signal is obtained may be selected. A precoder 52 for a partial response class 4 detection system is connected to each adaptive scramble circuit 51 and performs calculation processing of $1/(1-D^2)$ (D denotes a delay time of a unit delay circuit). The output of the precoder 52 is recorded by the magnetic heads 113A and 113B by way of the recording amplifiers 112A and 112B and reproduced by the magnetic heads 113A and 113B, respectively, and the reproduction outputs are amplified by the reproduction amplifiers 114A and 114B.

Figure 8:
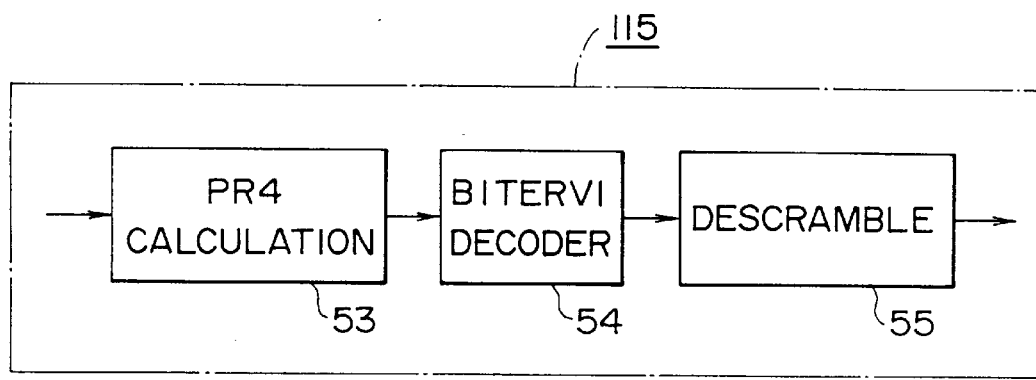
FIG. 8 is a block diagram of a channel decoder of the signal processing section of FIG. 5.

Meanwhile, the channel decoder 115 is shown more in detail in FIG. 8. Referring to FIG. 8, the channel decoder 115 includes a reproduction side calculation circuit 53 of the partial response class 4, which performs calculation of 1+D for the outputs of the reproduction amplifiers 114A and 114B. A so-called bitervi decoding circuit 54 is connected to the calculation circuit 53 and effects calculation for the output of the calculation circuit 53 using correlation, probability or the like of data to achieve decoding of data which is tough against noise. The output of the bitervi decoding circuit 54 is supplied to a descramble circuit 55, in which the data, which have been rearranged by the scrambling processing by the recording circuit, are returned into data of the original sequence to restore the original data. By the bitervi decoding circuit 54 employed in the present embodiment, a gain of 3 dB when converted into a reproduction C/N value is obtained, which is improved comparing with that by decoding for each bit.

d. Transport System

Figure 9A:
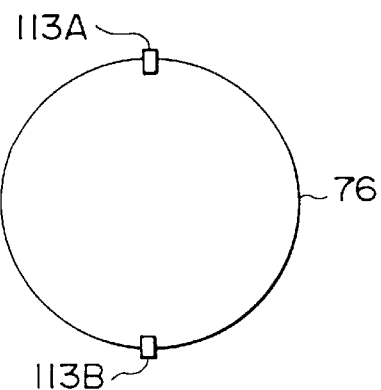
FIGS. 9A and 9B are diagrammatic views showing two different head arrangements.
Figure 9B:
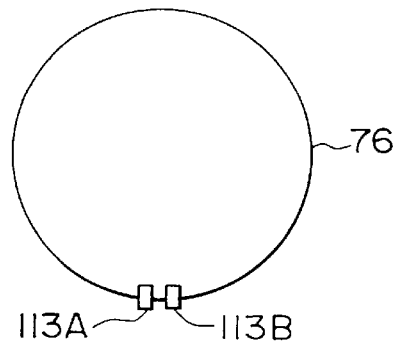

The magnetic heads 113A and 113B described above are either mounted at an angular distance of 180° on a drum 76 as shown, for example, in FIG. 9A or mounted on the drum 76 in the form of, for example, an integrated structure as shown in FIG. 9B. A magnetic tape (not shown) is wrapped obliquely over a wrapping angular range a little larger or a little smaller than 180° on a circumferential face of the drum 76. In the head arrangement shown in FIG. 9A, the magnetic heads 113A and 113B contact almost alternately with the magnetic tape, but in the head arrangement shown in FIG. 9B, the magnetic heads 113A and 113B scan the magnetic tape simultaneously with each other.

Figure 10:
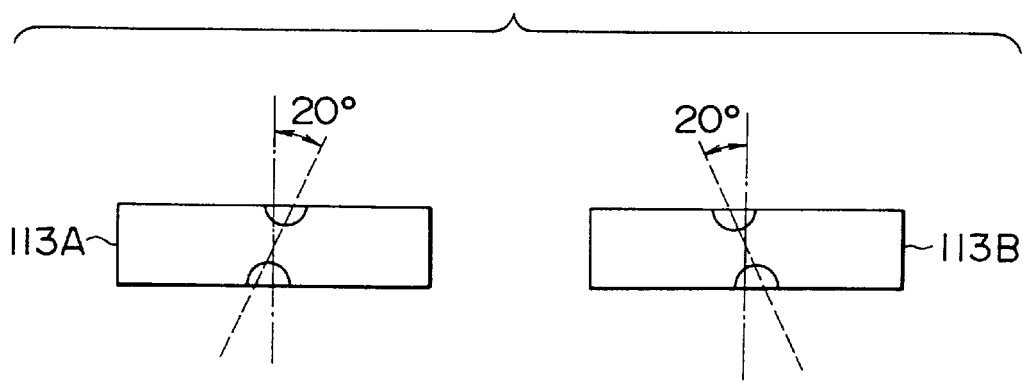
FIG. 10 is a diagrammatic view showing magnetic heads of a rotary head of the magnetic recording and reproducing apparatus.
Figure 11:
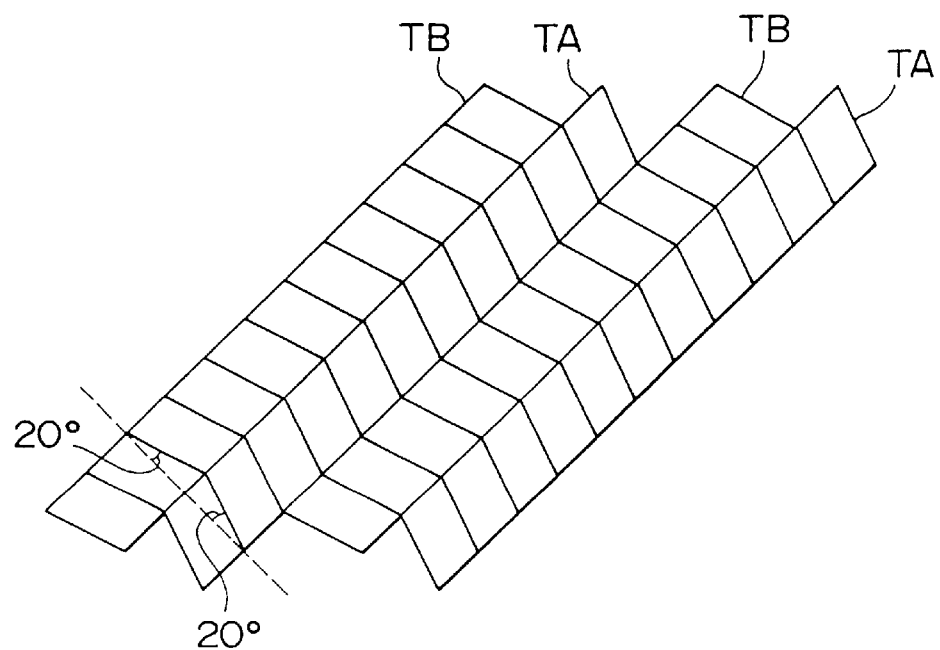
FIG. 11 is a diagrammatic view showing a recording pattern.

Further, the magnetic heads 113A and 113B are constructed such that the extending angles of gaps thereof (called azimuth angles) are different from each other. For example, as shown in FIG. 10, the azimuth angles of ±20° are set to the magnetic heads 113A and 113B, and due to the difference between the azimuth angles, a signal is recorded onto a magnetic tape such that, as seen from a recording pattern in FIG. 11, on adjacent tracks TA and TB, it is inclined in the opposite directions to each other with angles corresponding to the azimuth angles. Accordingly, upon reproduction, the amount of crosstalk between adjacent tracks can be reduced by an azimuth loss.

Figure 12:
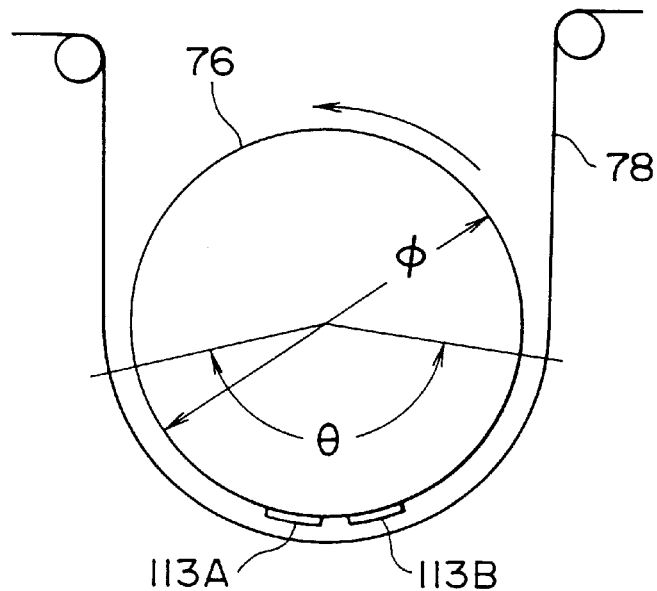
FIG. 12 is a schematic top plan view diagrammatically showing the head arrangement of FIG. 9B.
Figure 13:
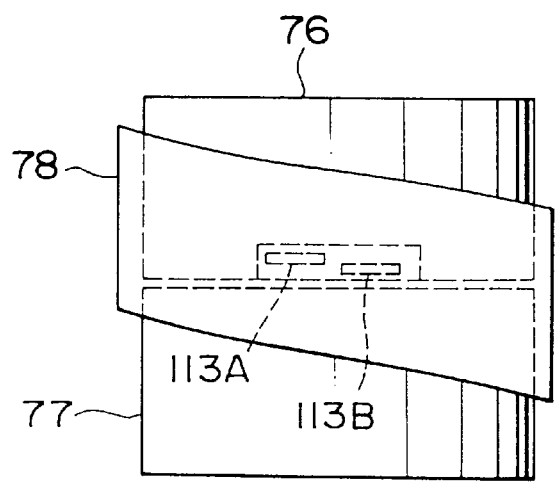
FIG. 13 is a schematic front elevational view of the head arrangement of FIG. 12.

FIGS. 12 and 13 show more detailed construction when the magnetic heads 113A and 113B are formed into an integrated structure (so-called double azimuth head). The magnetic heads 113A and 113B of the integrated structure are mounted on an upper guide drum 76 which is rotated at a high speed of, for example, 150 rps (NTSC system) while a lower guide drum 77 is fixed. Accordingly, data of one field are divided into and recorded onto 5 tracks on a magnetic head 78. The length of tracks can be reduced by the present segment system. The wrapping angle θ of the magnetic tape 78 is, for example, 166°, and the drum diameter φ is 16.5 mm.

Figure 14A:
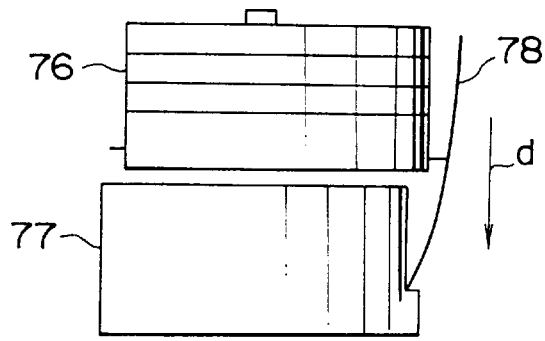
FIGS. 14A and 14B are schematic views illustrating vibrations of a magnetic tape.
Figure 14B:
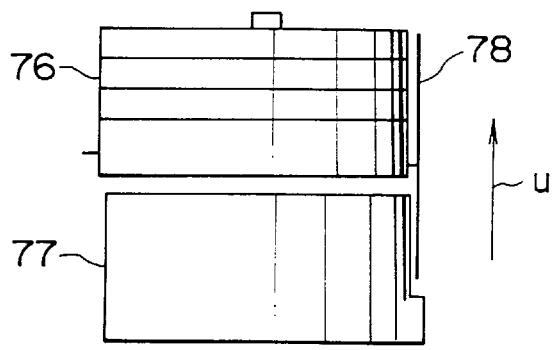

Further, it is also possible to effect simultaneous recording using a double azimuth head. Normally, vibrations of the magnetic tape 78 are caused by eccentricity or the like of a rotating portion of the upper drum 76, and such vibrations cause an error in linearity of a track. As indicated by an arrow mark d in FIG. 14A, the magnetic tape 78 is held downwardly, and as indicated by an arrow mark u in FIG. 14B, the magnetic tape 78 is drawn upwardly. Consequently, the magnetic tape 78 is vibrated, resulting in linearity of a track. However, comparing with an alternative arrangement wherein a pair of magnetic heads are disposed in a spaced relationship by 180° and in an opposing relationship to each other, the amount of such error in linearity can be decreased by simultaneous recording with the double azimuth head. Further, the double azimuth head is advantageous in that, since the distance between the heads is small, pairing adjustment can be performed with a higher degree of accuracy. Recording and reproduction of a narrow track can be performed by such tape and head system.

The present invention can be applied to a magnetic tape guide apparatus for the magnetic heads shown, for example, in FIGS. 9, 12 and 13 of the digital video tape recorder described above.

In particular, in this instance, the drums 76 for guiding the magnetic tape 78, particularly at least the fixed drum 77 on which the magnetic tape 78 slidably moves, is worked to roughen the surface thereof, that is, the magnetic tape guide face 11 thereof as shown in FIG. 1 by forming fine grooves along a circumferential direction on a circumferential face of a tubular metal member made of, for example, aluminum, an aluminum alloy or stainless steel by means of an NC (numerically controlled) machine tool.

In this instance, the height δ of crests of the roughened face, that is, maximum height Rmax, is selected to range from 0.2 μm to 3.0 μm. Here, the reason why the height δ is selected to be equal to or higher than 0.2 μm is that, where the height δ is lower than 0.2 μm, if the humidity becomes high, a sudden rise of frictional resistance takes place almost irrespective of the pitch x which is selected when the humidity is comparatively low. On the other hand, if the height δ exceeds 0.3 μm, then this may possibly have a bad influence on the roundness of the drum. Particularly, when digital video tape recorders are reduced in size in order to achieve popularization of them, the width $W_T$ of a magnetic tape for use with the digital video tape recorders is selected to be, for example, 6 mm, and in this connection, the radius of the guide drums 76 and 77 is set to be equal to or less than 12 mm taking a tracking error into consideration. In this instance, where δ>3.0 μm, a significant influence is had on the roundness, and there is the possibility that stabilized transport of a magnetic tape may be obstructed.

A pair of drums made of an aluminum ally were prepared wherein the height δ of crests on the surfaces of the drums, that is, the surface maximum roughness, is 1 μm and the pitch of the crests, that is, the working pitch x, is 47 μm and 75 μm, and a transport test was conducted slidably contacting a magnetic thin metal film magnetic tape on the market with the drums. A result of the test is shown in Table 1 below.

TABLE 1

| | Pitch x | 47 μm | 75 μm |
|---|---|---|---|
| Coefficient | 40° C. 11% RH | 0.21 | 0.21 |
| of Friction | 40° C. 85% RH | 0.32 | 0.29 |
| μ | 40° C. 95% RH | 0.73 | 0.43 |

In this instance, the difference in coefficient of friction originating in the pitch x little takes place within the range of 85% RH (relative humidity) or so at 40° C., and damage to the magnetic tape side does not present a difference between the pitches and the magnetic tape suffers from little damage.

Generally, as the coefficient μ of friction becomes high, not only sticking takes place but also a magnetic tape is damaged, but in this instance, if the coefficient μ of friction is equal to or lower than 0.7, a good transport performance can be obtained.

Thus, by calculating the relationship between the coefficient μ of friction and the working pitch x from the data at 95% RH in Table 1, the following equation 4 can be obtained:

$$\mu = 1.25 - 0.011x \quad (4)$$

Then, calculation of the condition of the pitch x which makes the coefficient μ of friction equal to or lower than 0.7 from the equation 4 above reveals that it is equal to or higher than 50 μm.

Figure 15:
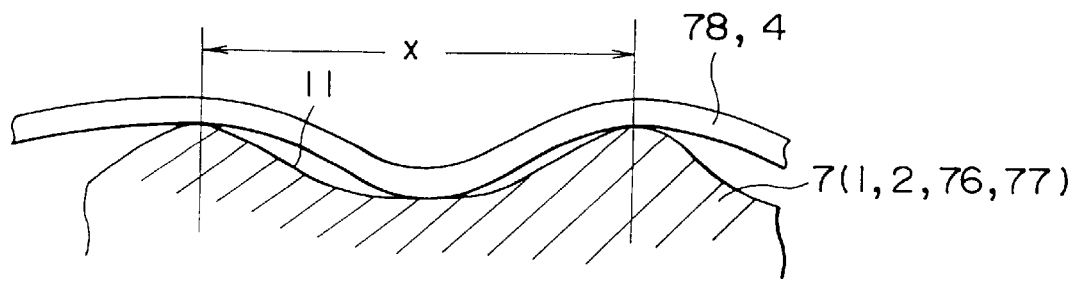
FIG. 15 is a schematic diagrammatic view illustrating slackening of a magnetic tape.

Meanwhile, as regards an upper limit of the pitch x, when a force acts in a perpendicular direction upon the magnetic tape 4 or 78 as shown in the schematic view of FIG. 15 so that a slack occurs with the magnetic tape, the relationship with the pitch x of the maximum value δmax of the slack with which the magnetic tape reaches a bottom of the guide face 11 to loose the effect of crests is given by the following equation 5 by the strength of materials:

$$\delta max = \frac{wx^4}{384EI} \quad (5)$$

where I is a moment of inertia of a sectional area per unit length of the magnetic tape in the longitudinal direction ($I=d^3/12$, where d represents the thickness of the magnetic tape), E is a Young's modulus of the magnetic tape, W ($=N/W_T$) is a distributed load per unit length of the magnetic tape in its widthwise direction, and $W_T$ is the width of the tape. Further, N is a force per unit length in a system in which the magnetic tape is wrapped on a guide drum with the tension T, and is given by the equation 6 below when the radius of the drum is represented by r:

$$N = 2T \sin(\tfrac{1}{2}r) \quad (6)$$

From the equations 5 and 6 above, the following equation 7 is obtained.

$$\max = \frac{(N/W_T)x^4}{384E(d^3/12)} \quad (7)$$

$$= \frac{Tx^4 \sin(1/2r)}{16Ed^3 W_T}$$

Here, since δmax depends upon δ described hereinabove, δmax=δ. Further, $E \approx 7 \times 10^9$ Nm$^{-2}$=$7 \times 10^9$ g/mmS$^2$, d=0.01 mm, $T \approx 4.9 \times 10^{-2}$ to $19.6 \times 10^{-2}$, $N = 4.9 \times 10^4$ to $9.8 \times 10^4$ gmm/S$^2$, r=10 to 20 mm, and $W_T$=6 mm.

Figure 16:
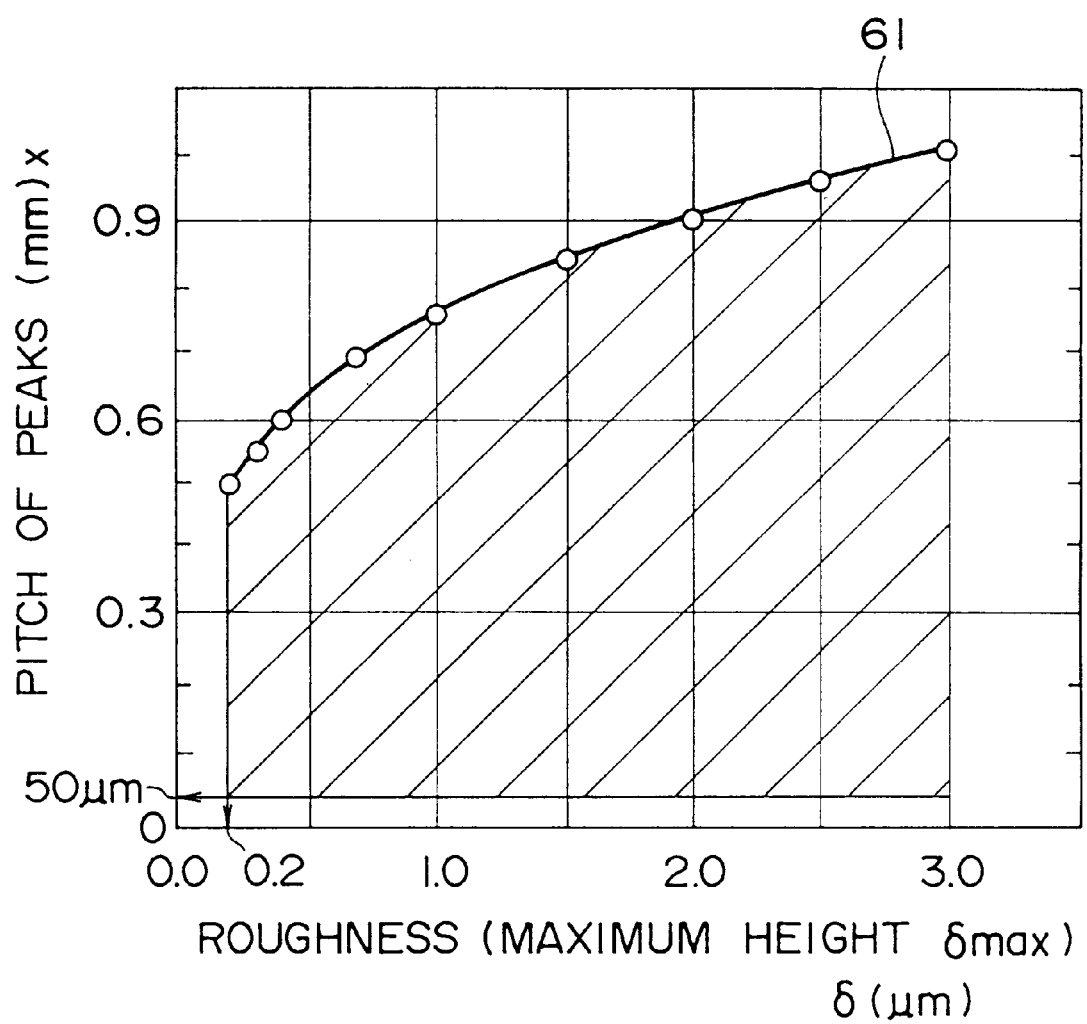
FIG. 16 is a diagram showing a relationship between the height and the pitch of crests of a convex and concave configuration of a guide member.

Based on the values, the relationship between δmax (=δ) and the pitch x is calculated from the equation 7 above. Thus, a curve 61 shown in FIG. 16 indicates the maximum value and is given by the following equation 8:

$$x = (329\delta)^{1/4} \quad (8)$$

Accordingly, the pitch x is selected so that it may satisfy the expression 3 given hereinabove, that is, $$0.050 \text{ mm} \leq x \leq (329\delta)^{1/4}$$

Further, the relationship of the coefficient $\mu$ of friction with the relative humidity was measured varying the height δ of crests of the guide drum and the pitch x, and results of the measurement are shown in FIGS. 17 to 21.

Figure 17:
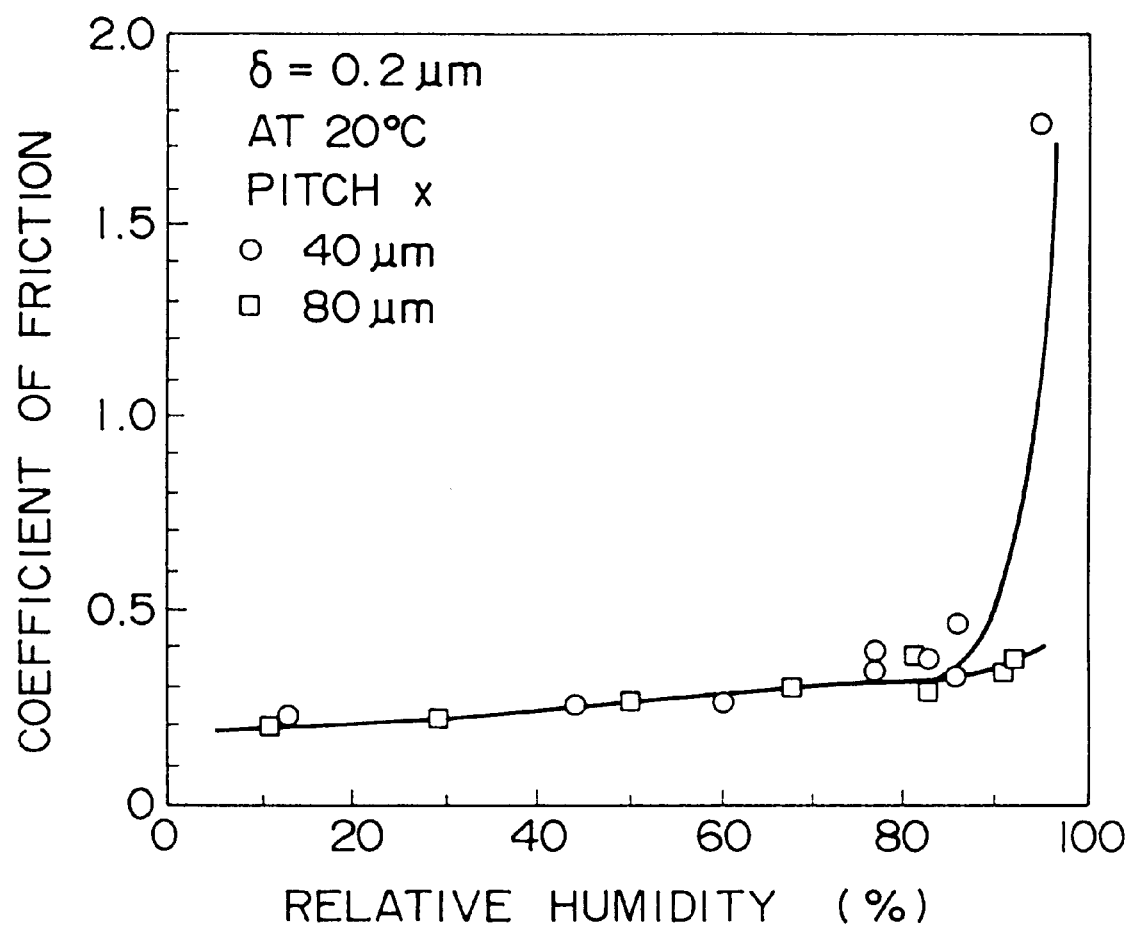
FIGS. 17 to 21 are diagrams showing the relationship between the relative humidity and the coefficient of friction of a guide member in various conditions.

FIG. 17 shows the result of measurement when δ=0.2 μm while x=40 μm (plotted with the mark ○) and x=80 μm (plotted with the mark ○).

Figure 18:
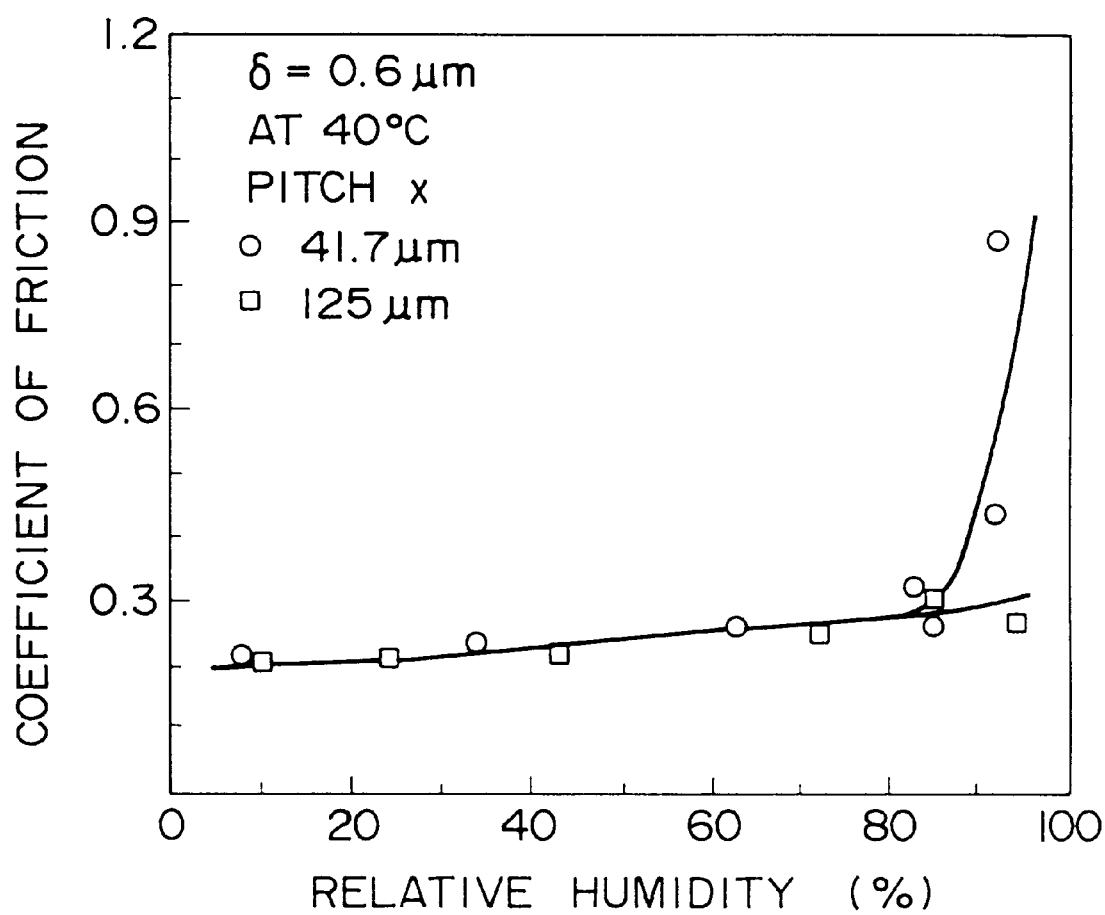

FIG. 18 shows the result of measurement when δ=0.6 μm while x=41.7 μm (plotted with the mark ○) and x=125 μm (plotted with the mark □).

Figure 19:
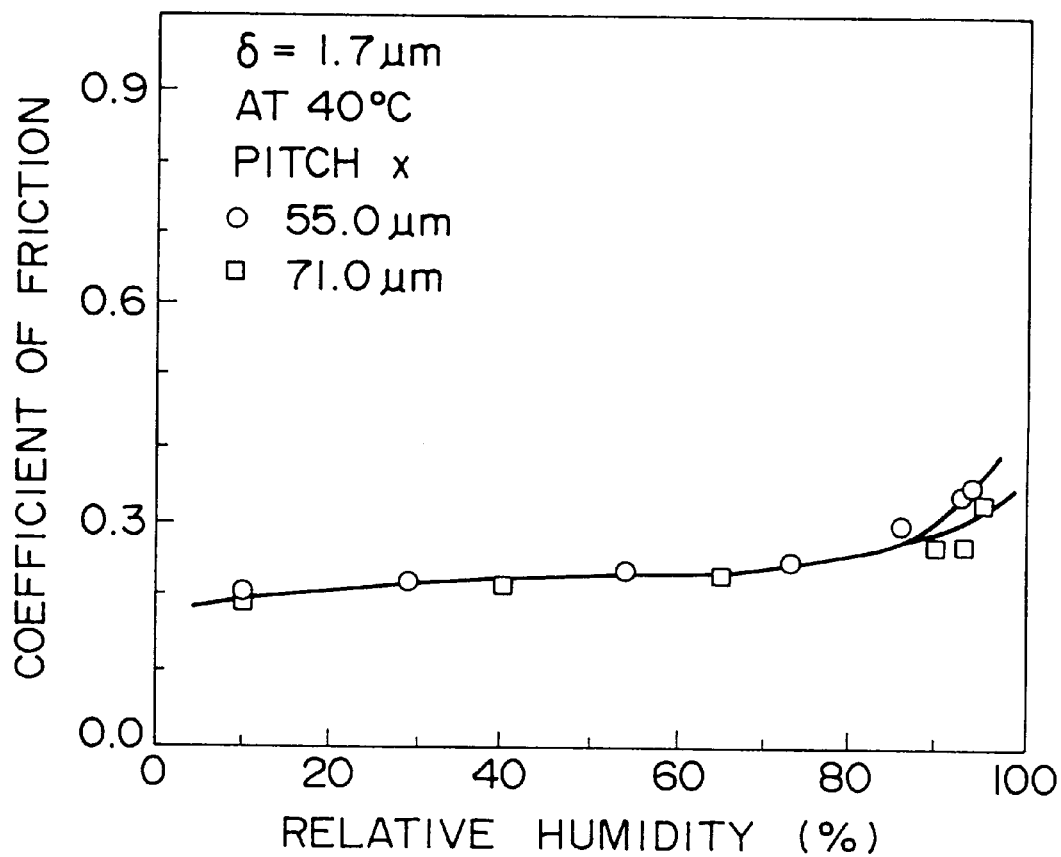

FIG. 19 shows the result of measurement when δ=1.7 μm while x=55.0 μm (plotted with the mark ○) and x=71.0 μm (plotted with the mark □).

Figure 20:
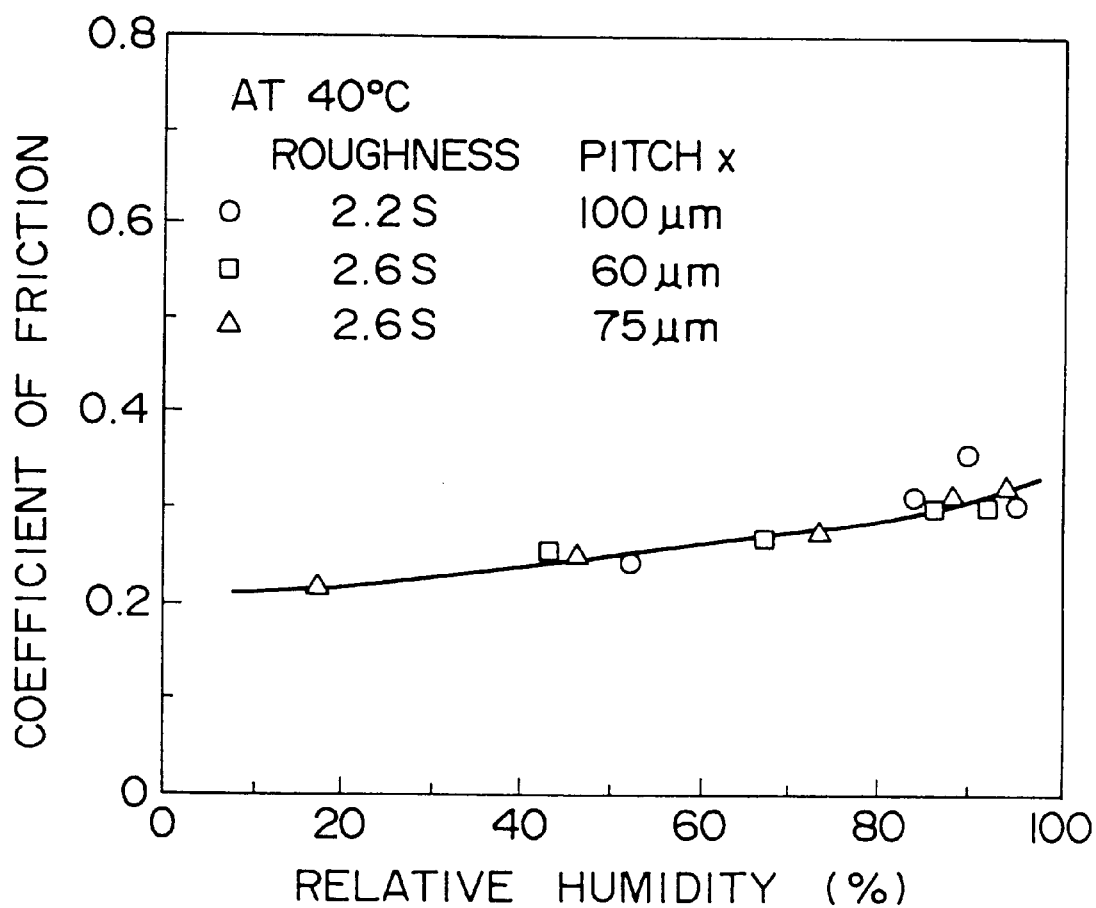

FIG. 20 shows the results of measurement when δ=2.2 μm and x =40 μm (plotted with the mark ○), when δ=2.6 μm and x=60 μm (plotted with the mark □), and when δ=2.6 μm and x=75 μm (plotted with the mark Δ).

As can apparently be seen from FIGS. 17 to 20, when x=40 μm and x=41.7 while x≦50 μm, a sudden rise of the coefficient of friction is caused by a rise of the humidity.

Figure 21:
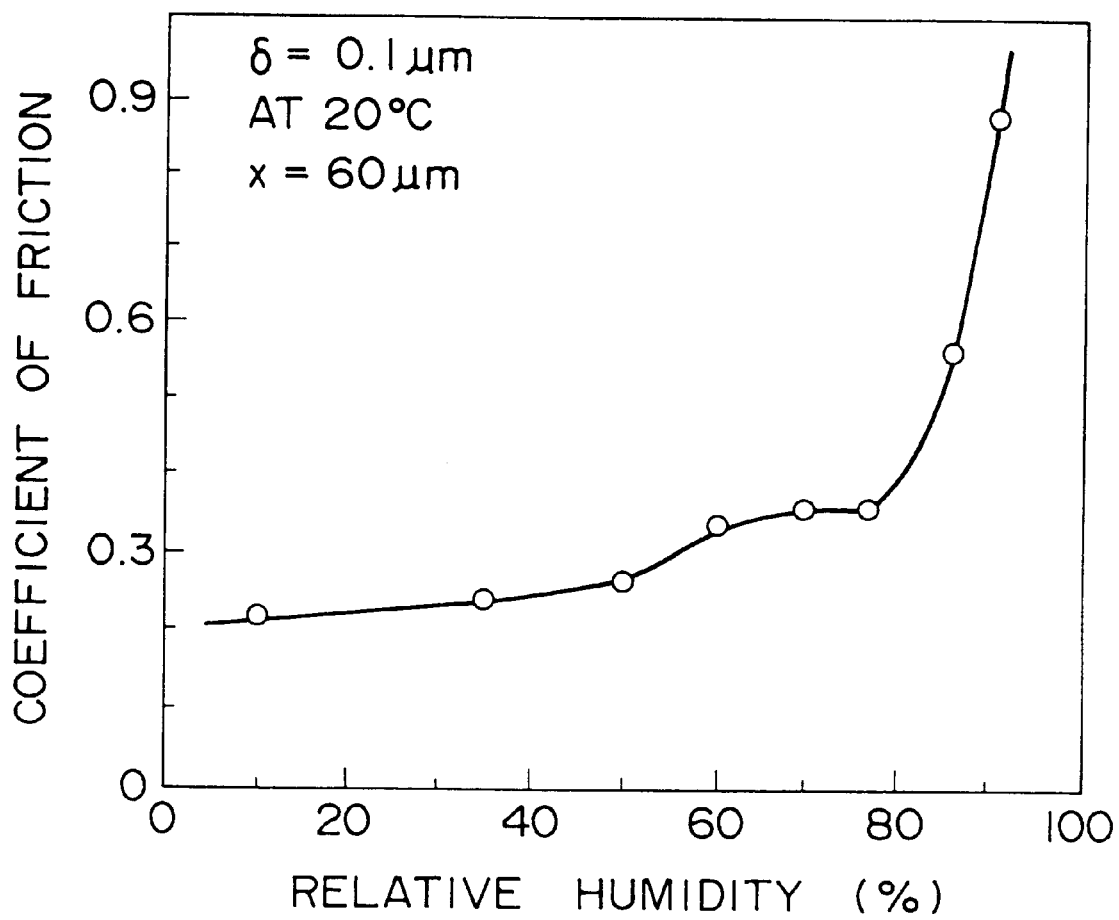
Figure 22:
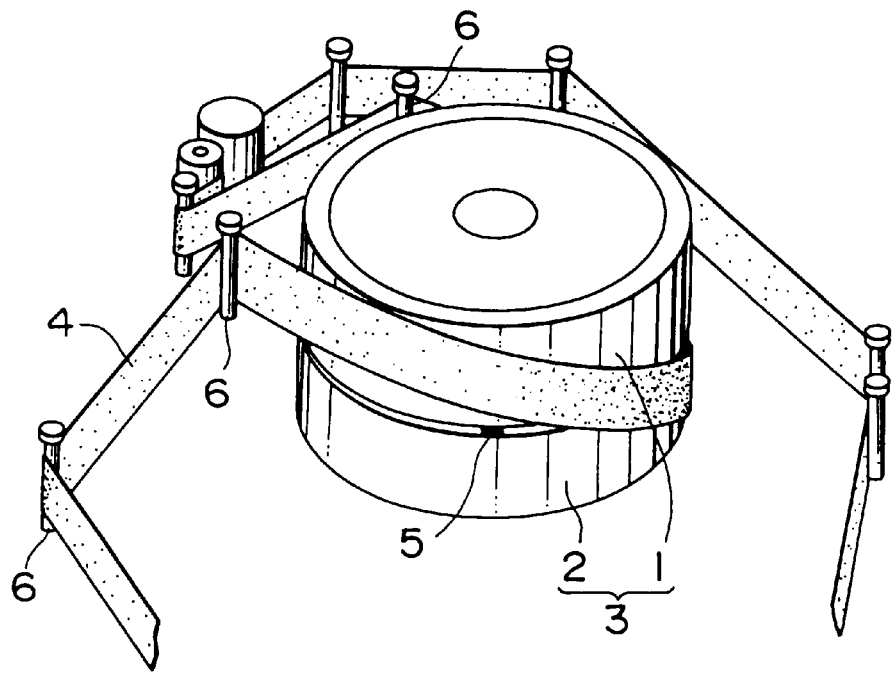
FIG. 22 is a perspective view showing a magnetic tape guide apparatus to which the present invention can be applied.
Figure 23:
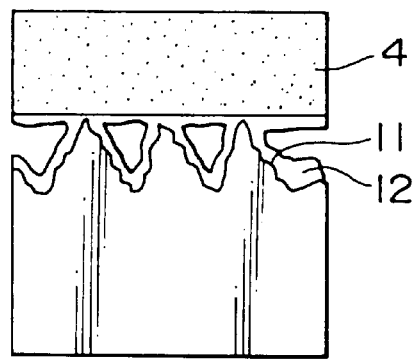
FIG. 23 is a diagrammatic view showing a guide face of a guide member and a magnetic tape.
Figure 24:
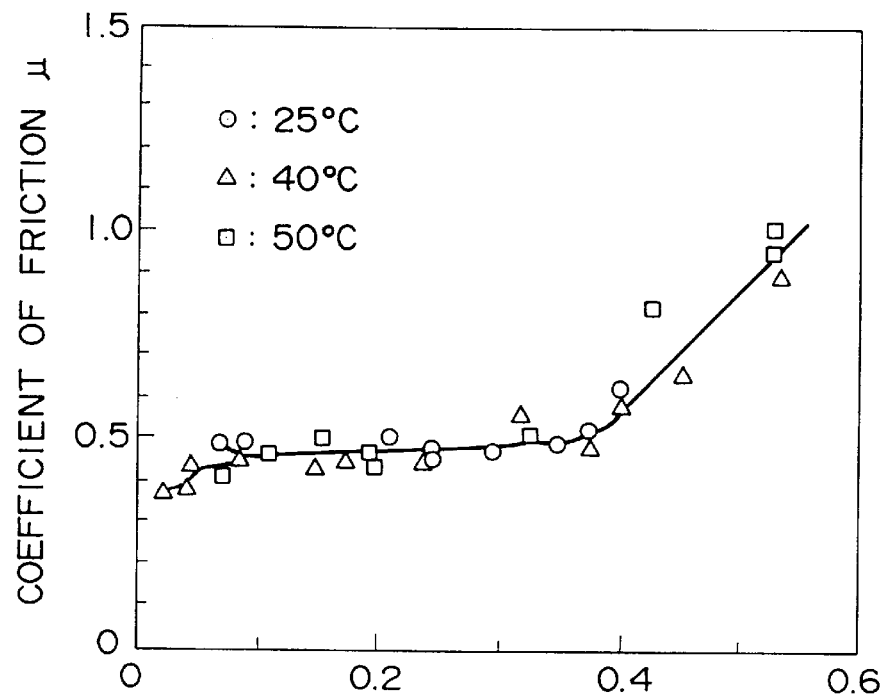
FIG. 24 is a diagram showing the relationship between the coefficient of friction and the film thickness of water attached to a guide member.
Figure 25:
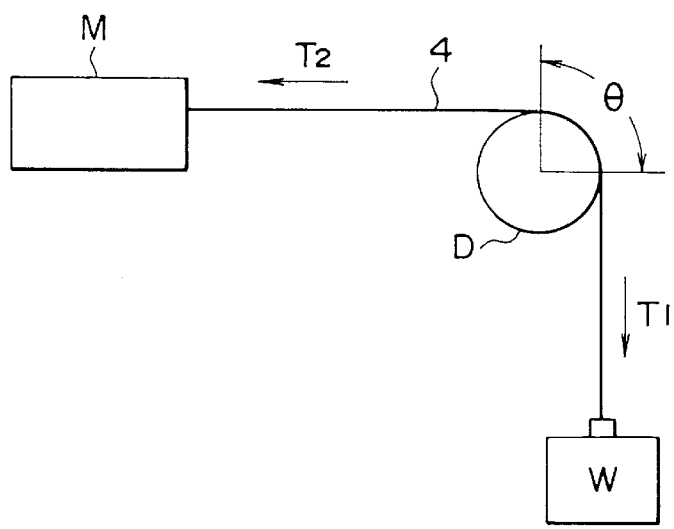
FIG. 25 is a schematic view illustrating a frictional coefficient measuring method.

Further, FIG. 21 shows the result of measurement when δ=0.1 μm, which is lower than the lower limit of 0.2 μm of the range specified according to the present invention. In FIG. 21, while the pitch x was set to x =60 μm, which satisfies the expression 3 above, a sudden rise of the coefficient $\mu$ of friction occurs at or around the relative humidity of 80%.

As apparent from the foregoing description, according to the present invention, since an increase of friction in a high humidity condition can be suppressed effectively, the present invention exhibits considerable contribution to reduction of the error rate and can be suitably applied particularly to a digital video tape recorder which is aimed to the error rate of $10^{-5}$ order.

Having now fully described the invention, it will be apparent to one of ordinary skill in the art that many changes and modifications can be made thereto without departing from the spirit and scope of the invention as set forth herein.

What is claimed is:

1. A magnetic tape guide apparatus, comprising:

a guide member having a cylindrical profile for guiding a magnetic tape along a magnetic tape guide face provided by an outer circumferential face thereof, said magnetic tape guide face being formed as a roughened face wherein the height δ of crests is selected within the range of 0.2 μm to 3.0 μm and the pitch x of the crests is selected so that it satisfies 0.050 mm≦x ≦$(329\delta)^{0.25}$ mm.

2. A magnetic tape guide apparatus as claimed in claim 1, wherein said guide member has a radius which ranges from 0.7 to 12 mm inclusive of the height δ of the crests.

3. A magnetic tape guide apparatus according to claim 1, wherein said guide member is a guide drum on which a magnetic head is carried.

4. A magnetic tape guide apparatus according to claim 1, wherein said guide member is a guide pin disposed in the proximity of a guide drum on which a magnetic head is carried.

5. A magnetic tape guide apparatus as claimed in claim 1, wherein said guide member is of metal.

6. A magnetic tape guide apparatus as claimed in claim 1, wherein said roughened face comprises substantially parallel grooves formed in said magnetic tape guide face.

* * * * *